US009074779B2

(12) United States Patent
Robinson et al.

(10) Patent No.: US 9,074,779 B2
(45) Date of Patent: Jul. 7, 2015

(54) DISTRIBUTION MODULE FOR WATER HEATER

(75) Inventors: Edgar C. Robinson, Vancouver (CA); Craig W. Garrison, Richmond (CA)

(73) Assignee: International Thermal Investments Ltd., Richmond (CA)

(*) Notice: Subject to any disclaimer, the term of this patent is extended or adjusted under 35 U.S.C. 154(b) by 428 days.

(21) Appl. No.: 10/953,078

(22) Filed: Sep. 28, 2004

(65) Prior Publication Data

US 2005/0284948 A1 Dec. 29, 2005

Related U.S. Application Data

(63) Continuation-in-part of application No. 10/848,780, filed on May 18, 2004.

(51) Int. Cl.

*F24H 1/22* (2006.01)
*F24D 3/08* (2006.01)
*F24H 1/28* (2006.01)

(52) U.S. Cl.

CPC . *F24D 3/08* (2013.01); *F24H 1/287* (2013.01)

(58) Field of Classification Search

CPC .................................... F24H 1/22; F24D 3/08
USPC ................ 237/16, 19, 12.3 R, 2 A, 8, 12.3 B, 237/12.3 C; 126/101
See application file for complete search history.

(56) References Cited

U.S. PATENT DOCUMENTS 2,726,042 A * 12/1955 Baier et al. ............... 237/12.3 C
3,758,031 A 9/1973 Moran
4,479,605 A * 10/1984 Billotte et al. ................ 237/8 R
4,587,401 A * 5/1986 Ekman .......................... 392/495
4,823,770 A * 4/1989 Loeffler ....................... 122/15.1
5,025,958 A * 6/1991 Montaner et al. .......... 222/321.2
5,025,985 A * 6/1991 Enander ........................ 237/2 A
5,226,594 A * 7/1993 Swenson ....................... 237/2 B
5,253,805 A * 10/1993 Swenson ....................... 237/2 B
5,772,113 A * 6/1998 Gerstmann et al. ........... 237/8 R
6,109,339 A * 8/2000 Talbert et al. ................ 165/48.1
6,688,048 B2 * 2/2004 Staschik ........................ 52/79.1
6,688,805 B1 * 2/2004 Kochling .......................... 404/7
7,284,710 B2 * 10/2007 Rixen et al. .............. 237/12.3 B
8,783,581 B2 * 7/2014 Van Ruijven ............ 237/12.3 B
2003/0010835 A1 * 1/2003 Murgu et al. ............ 237/12.3 B
2003/0230633 A1 * 12/2003 Rixen et al. ..................... 237/69

FOREIGN PATENT DOCUMENTS

| | | |
|---|---|---|
| CA | 305053 | 10/1930 |
| CA | 506386 | 10/1954 |
| CA | 1118026 | 2/1982 |
| CA | 1293987 | 1/1992 |
| CA | 2129283 | 4/1999 |
| CA | 2269106 | 10/1999 |
| CA | 2415905 | 7/2004 |
| WO | WO90/09901 | 9/1990 |

* cited by examiner

*Primary Examiner* — Gregory Huson
*Assistant Examiner* — Nikhil Mashruwala
(74) *Attorney, Agent, or Firm* — John Russell Uren

(57) ABSTRACT

A distribution module for a boat or vehicle which distribution module includes at least one heat exchanger and inlet and outlet fittings for a plurality of water or coolant circuits. A pump is conveniently provided with the distribution module for zone heating and a mixing valve may be further provided for adjusting the temperature of potable water heated within the heat exchanger.

7 Claims, 7 Drawing Sheets

DISTRIBUTION MODULE FOR WATER HEATER

CROSS-REFERENCE TO RELATED APPLICATION

This application is a continuation-in-part of U.S. patent application Ser. No. 10/848,780 filed May 18, 2004, presently pending, and entitled IMPROVED POTABLE WATER HEATER.

INTRODUCTION

This invention relates to a distribution module and, more particularly, to a distribution module used with a plurality of water and coolant circulation systems in a boat or vehicle.

BACKGROUND OF THE INVENTION

Recreational vehicles, motor homes, trucks, boats and the like, particularly ones of the larger variety, often have a plurality of water and coolant circuits. A first circuit may extend from the engine of the vehicle or boat and is typically used for heating the interior or the vehicle or boat. A second circuit may extend from an auxiliary heater which may also be used for heating when the engine is not operating. A third circuit may extend from a source of potable water used for cooking and other personal use. A further circuit may be used for zone heating and heat exchangers between the various circuits are common. The heating module and the engine are usually not made by the same manufacturer and they may not be installed at the same time. Accordingly, adapting a the previously installed system with a newly installed system is inefficient and time consuming due to the many connections, heat exchanger, pumps valves and the like.

SUMMARY OF THE INVENTION

According to one aspect of the invention, there is provided a distribution module for a hot water heater system, said distribution module comprising an engine heater coolant inlet and outlet to allow for the ingress to and egress from said distribution module of engine coolant from an engine, a potable water inlet and outlet to allow for the ingress to and egress from said distribution module of potable water, a coolant heater inlet and outlet to allow for the ingress to and egress from said distribution module of heater coolant from a coolant heater and at least one heat exchanger to exchange heat between said heater coolant and/or said engine coolant and said potable water.

According to a further aspect of the invention, there is provided a distribution module for a hot water heating system comprising an inlet and an outlet for connection to a potable water heater circuit, a heat exchanger having an inlet and outlet from said inlet and outlet for said potable water heater circuit, an inlet and outlet for connection to a coolant circuit containing a zone heater and a pump within said distribution module for moving said coolant through said coolant circuit.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1A:
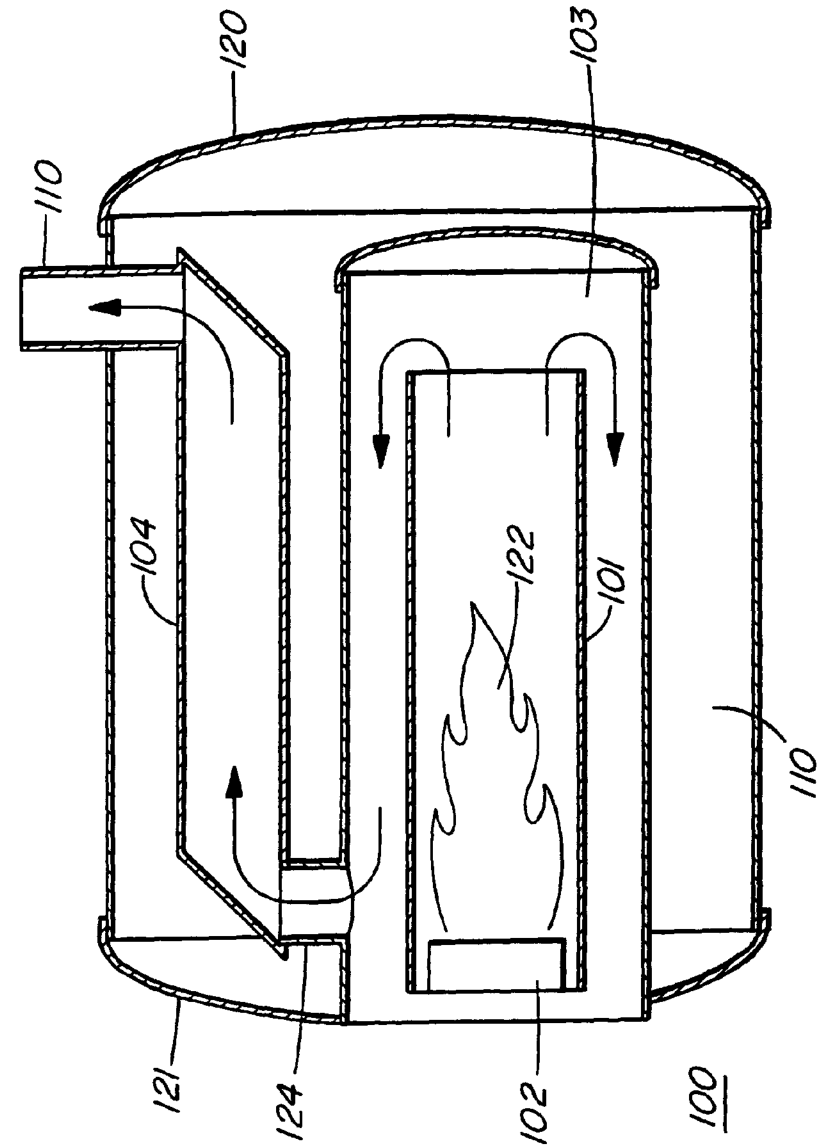
FIGS. 1A and 1B are diagrammatic side and end views, respectively, of a potable water heater according to the invention.

Referring now to the drawings, the potable water heating system is generally illustrated at 100 in FIG. 1A. The exhaust is created by a centrally located burner 101 which is conveniently diesel fuel powered and which burner 101 utilises pressurized air for the nozzle 102 where the diesel fuel and the air combine to provide the combustion flame 122. The burner 101 is conveniently a burner utilised in a HURRICANE (Trademark) heating system manufactured by International Thermal Research Ltd. of Richmond, British Columbia, Canada.

The heating system 100 includes an exhaust jacket 103 surrounding the burner 101 which exhaust jacket 103 conveys hot exhaust to an exhaust manifold 104 and thence to a stack 110 which releases the hot gases to the atmosphere, the direction of flow of the hot exhaust being illustrated by the arrows.

A potable water jacket 110 surrounds the burner 101 and carries potable water. Cold potable water enters the water jacket 110 at cold water inlet 112 (FIG. 1B) and, after being heated by the hot gases in the exhaust jacket 103, the now heated potable water leaves at water outlet 113.

Figure 1B:
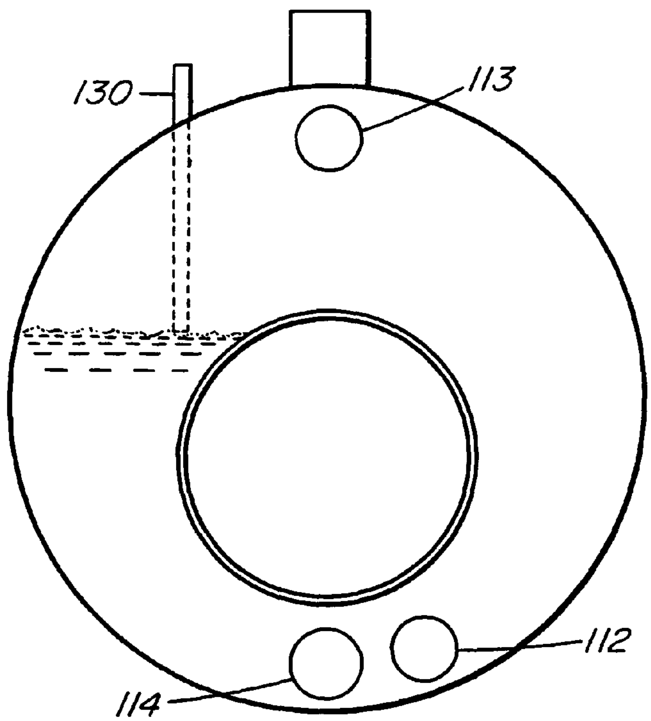

An electrical or resistance element 114 is inserted into the water jacket 110 from the end as illustrated in FIG. 1B. The electrical element 114 is a resistance type 120 volt heater and is electrically powered to assist in maintaining the temperature of the potable water when the burner 101 is not operating such as when the vehicle or boat has an independent source of power available.

The heating system 100 is pressurized; that is, the heating system 100 is a closed system. As such, there are forces acting on the end portions 120, 121 of the water jacket 110. The end portions 120, 121 are each generally convex on the outside surface and concave on the inside surfaces 126, 127 which inside surfaces 126, 127 are exposed to the potable water under pressure in the water jacket 110.

A water level sensor generally illustrated at 130 (FIG. 1B) is inserted into the potable water heater 100. Water level sensor 130 is used to sense the presence of water within the heater 100. In the event the sensor 130 does not sense water within the heater 100, a signal 131 is sent to a control board (not illustrated) which signal results in heater shutdown with the control board terminating operation of the burner 101.

Figure 3:
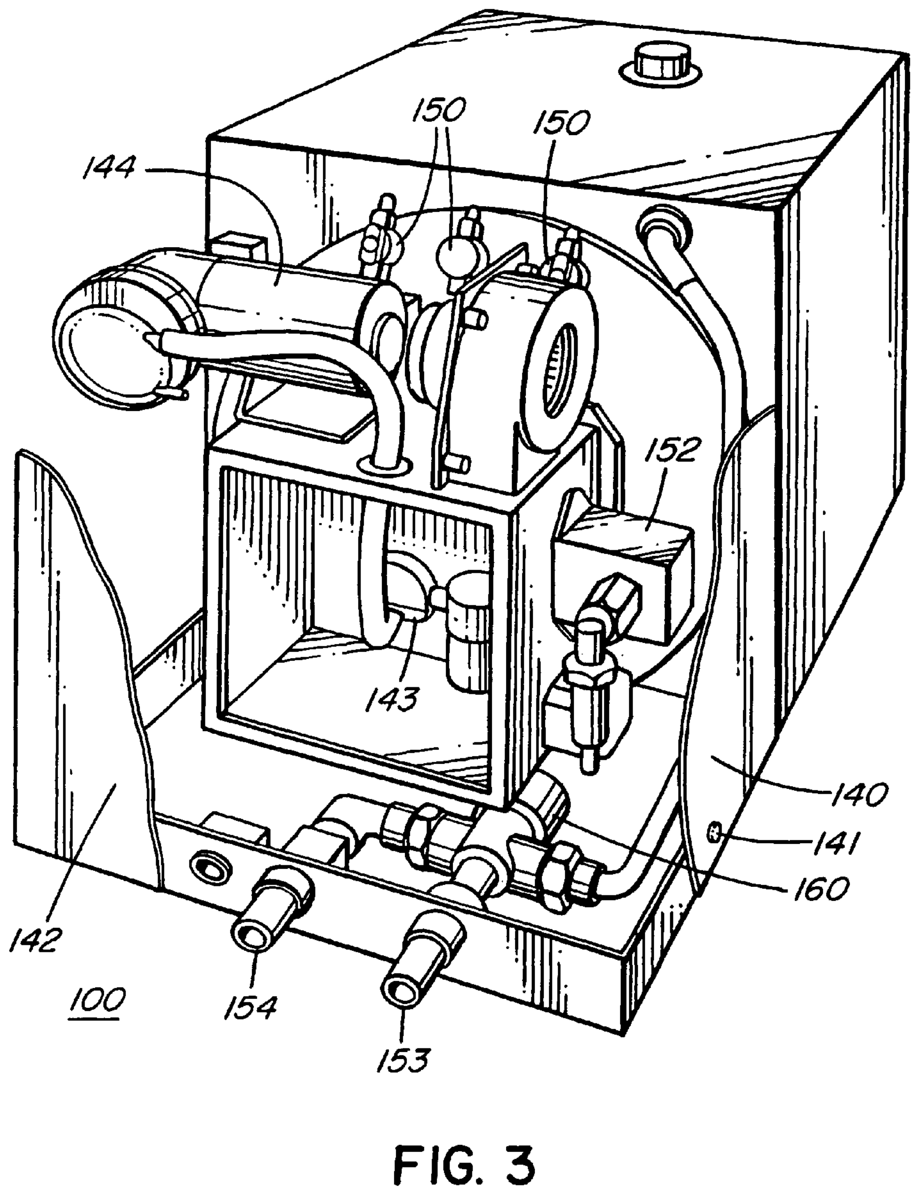
FIG. 3 is an isometric and partial cutaway view of one end of the heater according to the invention particularly illustrating the accessibility of the various components for serving and the water inlet and outlets.

Referring now to FIG. 3, one end of the heater 100 is illustrated. It will be appreciated that the heater 100 is conveniently installed in a recreational vehicle (not shown) from the end; that is, it is mounted endwise and, if servicing is required, it is conveniently done by opening access to one end of the heater 100 only so that the heater 100 need not be removed in its entirety for servicing. To that end, a single removable and peripheral wrap around panel member partially shown at 140 which covers the two sides and the top of the heater 100 is conveniently attached with removable attachments 141 (one of which is shown) such as screws, bolts and the like on opposite sides of the heater 100. A further and front panel member 142 is conveniently attached to the front of the heater 100 and is similarly easily removed by removing its attachment screws (not shown). When the end panel 142 and/or the side panel 140 are removed, the operating components of the heater 100 are readily visible and manually accessible from the end of the heater 100 and servicing is possible without the removal of the heater 100 from the recreational vehicle or boat. The burner assembly 143, the compressor 144, the aquastats 150 mounted in the water jacket and at the end of the combustion chamber, the combustion fan 151, and the fuel pump 152 are all readily accessible to a user of the heater 100 and may be removed and serviced from the end of the heater 100 without removal of the heater 100 from the vehicle in which it is installed. In addition, the cold water inlet 153 and the hot water outlet 154 are similarly conveniently located at the end of the heater 100 with a mixing valve 160 also conveniently located at the end of the heater 100 for access.

Operation

In operation, ignition of the fuel and air will take place as is usual, such as with the use of an ignition electrode (not shown) and a combustion flame 122 will appear in the burner tube 101 from the combustion of the pressurized air and fuel combined in the nozzle 102 (FIG. 1A). Hot gases will subsequently emanate from the combustion flame 122 and leave the end of the burner tube 101 as is shown by the arrows, the hot gases traveling first into the exhaust jacket 103 to a first stack 124 which transfers the exhaust gases to a second passageway 104 located within the water jacket 110 of the burner 100. The exhaust will exit the second passageway 104 through outside stack 110 and subsequently is released to the atmosphere.

Thus, it will be seen that the heat from the exhaust gases are used to heat the exhaust manifold 104 which manifold is in contact with the potable water within the heater 100. Additional heat is therefore provided to the potable water through the exhaust manifold 104 which, because of its location within the potable water jacket 110, will enhance the heating of the potable water prior to the exhaust gases being released to the atmosphere and improve the efficiency of the burner. A further advantage is that the stack temperature will be reduce because heat in the exhaust gases will be transferred to the potable water before the exhaust gases reach stack 100.

Because the water is under pressure within the water jacket 110, the force of the water will act against the end portions 120, 121 of the water heater 100. This force may be intermittent with the result that cyclical stress arises. It has been found that having the end portions 120, 121 assume a convex outside configuration and a concave inside configuration will reduce the amplitude of the cyclic stress on heater 100. The forces acting on the end portions, therefore, are better absorbed by the housing of the heater 100.

Access to the operating components associated with the combustion in heater 100 is conveniently provided by the removable side and end panels 140, 142 respectively (FIG. 3). The user or operator may unscrew the attachment screws 141 and remove the side and top panel 140 and likewise remove the end panel 142. The burner assembly 143 may then be removed for servicing. If the other operating components need servicing or replacement such as the compressor 144, the combustion fan 151, the fuel pump 152 or the aquastats 150, their location on one end of the heater 100 conveniently provides access without removal of the heater 100 from the vehicle and without the necessity of removing panels other than those located at one end of the heater 100. Similarly, the mixing valve 160 may easily be adjusted for raising or lowering the temperature of the hot water exiting the water heater 100 from hot water outlet 154.

Figure 4:
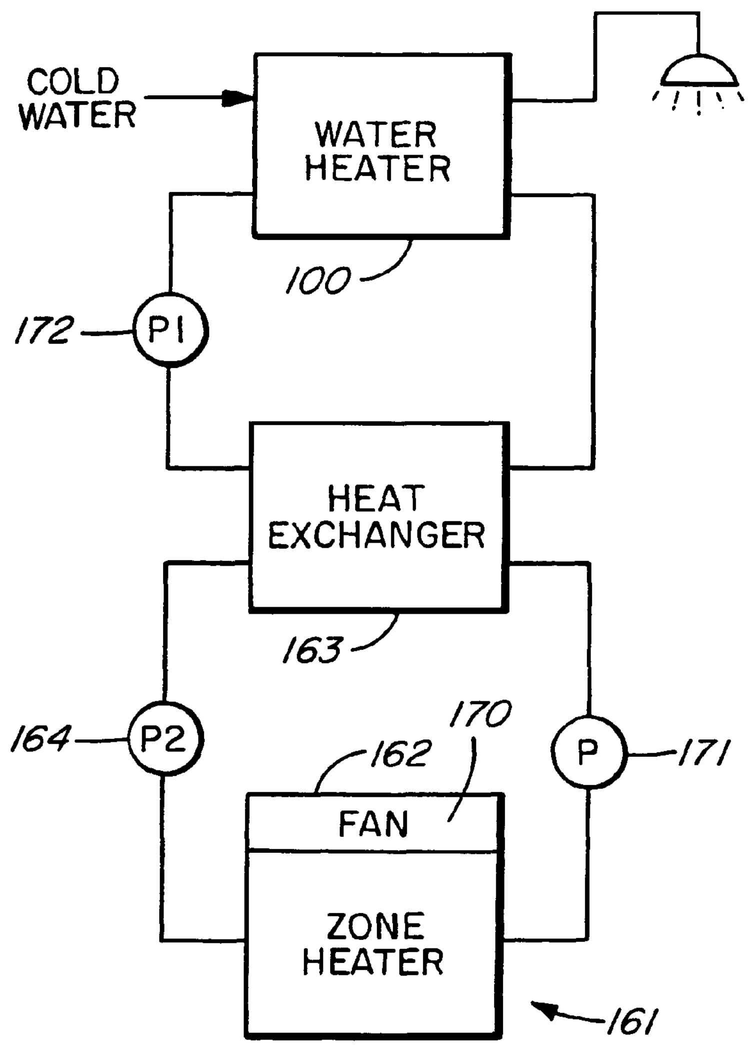
FIG. 4 is a diagrammatic schematic of a zone heater which zone heater is used in operable association with the heater according to the invention.

A further embodiment of the invention is illustrated in FIG. 4 from which a zone heater generally illustrated at 161 is operably connected to the potable water heater 100. Zone heater 161 conveniently includes a fan 162 which blows air over a radiator within the zone heater 161. A glycol mixture circulates through the zone heater 161 and a heat exchanger 163 by the use of a pump 164 which is operably connected to an aquastat 170 which measures the temperature of the circulating glycol mixture. An expansion tank 170 is conveniently provided in the circuit of the zone heater 162.

A second pump 172 and an associated aquastat 173 are provided to pump the potable water heated within the potable water heater 100 through the heat exchanger 163 thereby to exchange heat with the glycol mixture circulating through the zone heater 161. The pumps 164, 171 are initiated by a thermostat located in the zone serviced by the zone heater 161.

Figure 5B:
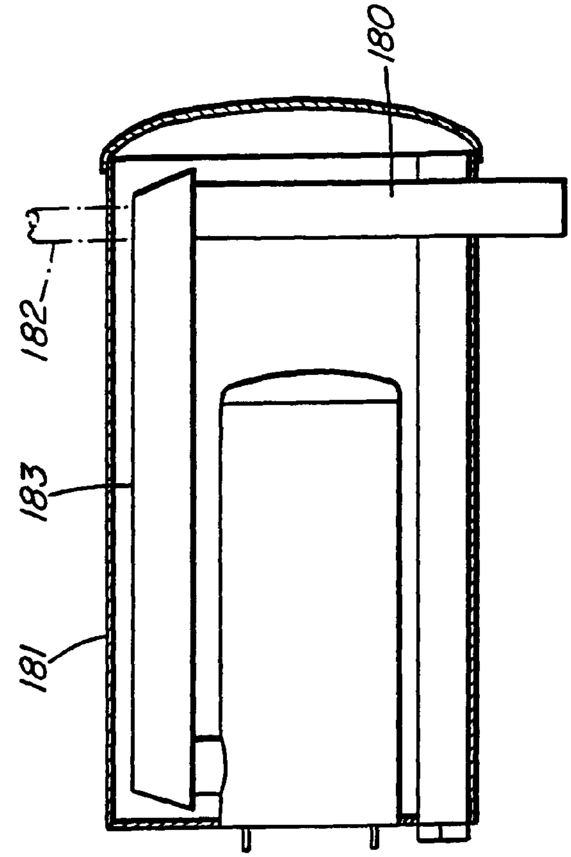
FIGS. 5A and 5B are diagrammatic end and side cutaway views of a further embodiment of the invention in which a heater according to the invention may be used in two different applications.
Figure 5A:
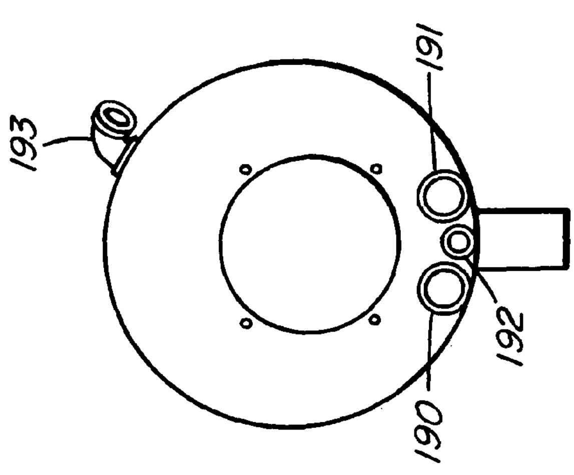

Reference is now made to FIGS. 5A and 5B which illustrate an improved efficiency heater similar to the potable water heater 100 of FIGS. 1A and 1B. In this embodiment, however, a coolant other than potable water may be used with the same efficiencies, such a coolant being, for example, glycol. A further aspect of the FIG. 5 embodiment lies in a configuration which may be adapted for heater use in two (2) installations. The first installation, as shown in FIG. 5B, incorporates a final exhaust stack 180 which extends downwardly within the heater 181 and exits the heater 181 from the bottom. This exhaust configuration may conveniently be used for recreational vehicles and other vehicles where the exhaust is routed along the bottom of the vehicle. A second final exhaust configuration is shown in broken lines at 182. A hole is cut in the top of coolant stack 183 and the final exit or exhaust stack 182 is connected and exits the top of the coolant heater 181. Electric elements 190, 191 are conveniently provided to heat the coolant when electric power is available. Cold coolant enters the coolant heater at 192 and may conveniently exit the heater 181 at 193 although ingress and egress of the coolant may be similar to that in the FIG. 1 embodiment. Other operating configurations particularly described in association with the FIG. 1 embodiment may likewise be useful in the FIG. 5 embodiment.

Figure 6:
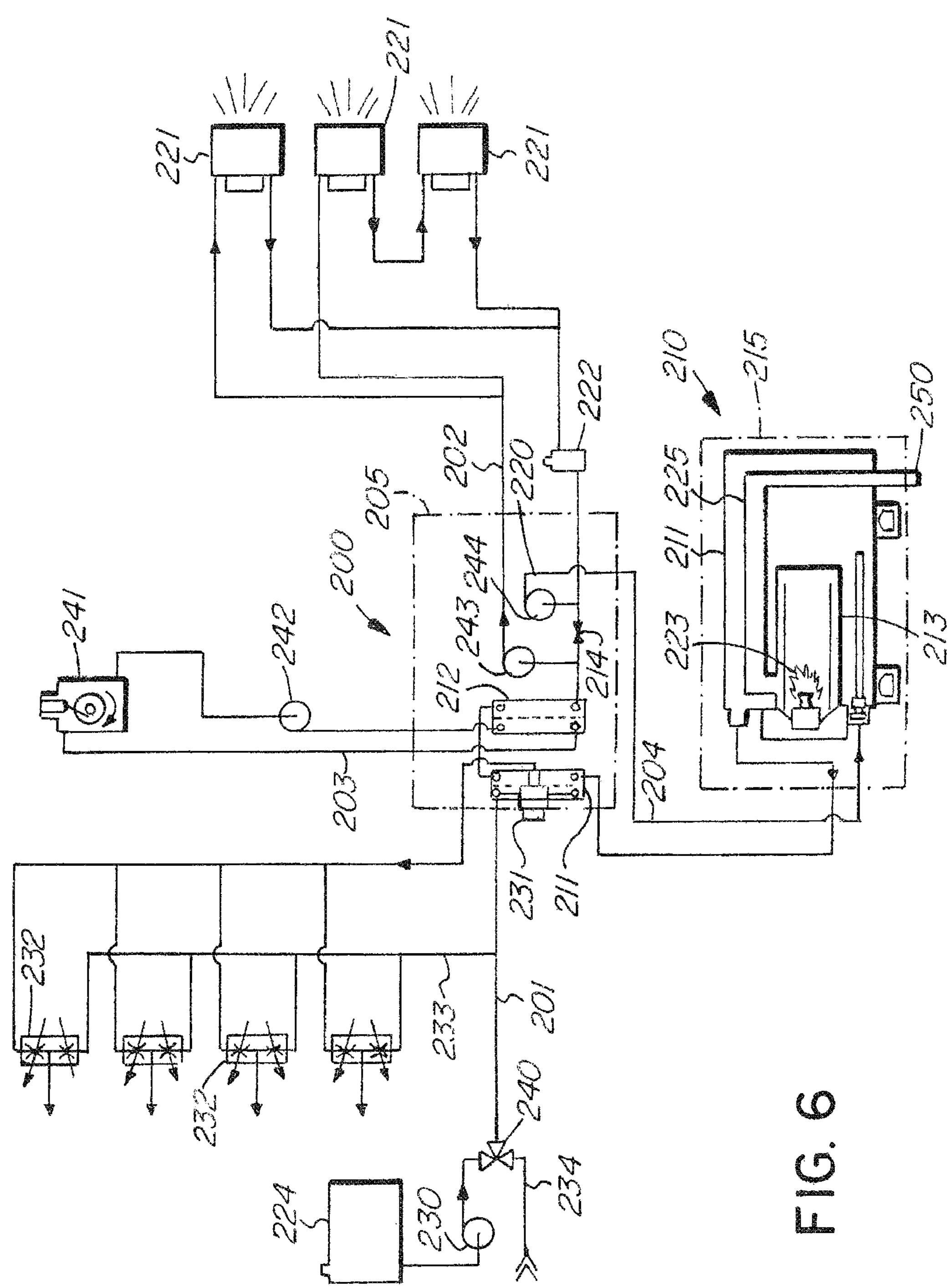
FIG. 6 is a diagrammatic schematic of a distribution module according to a further aspect of the invention in which hot and cold potable water is provided for personal use and which utilises heater and engine coolant for heating.

With reference to FIG. 6 and in yet a further embodiment of the invention, there is provided a distribution module generally illustrated at 200 for a potable water heater circuit 201, a zone heater coolant circuit or "winter" loop 202, an engine coolant circuit 203 and a coolant heater circuit 204. A coolant heater is generally illustrated at 210 with a casing diagrammatically illustrated at 215. Such a heater 210 is conveniently a diesel powered hot water heater known as a HURRICANE (Trademark) hot water heater manufactured by International Thermal Research of Richmond, British Columbia, Canada. The coolant heater 210 is used to heat a coolant, conveniently a glycol-water mixture, which coolant circulates through the storage tank 211 of the coolant heater 210 which surrounds the burner 213 and passes into a first heat exchanger 211 and thence into a second heat exchanger 212. A solenoid 214 is interposed between a "summer" heater coolant loop 220 and winter heater coolant loop 202. The summer heater coolant loop 220 returns the coolant to the coolant heater 210. The winter heater coolant loop 202 includes a plurality of zone heaters 221 and an overflow tank 222. If the winter heater coolant loop 202 is enabled, heater coolant will pass through the zone heaters 221 to the summer engine loop 220 where the coolant returns to the coolant heater 210 for reheating by the combustion flame 223 in burner 213. It will be noted that the exhaust from the burner 213 passes through a jacket 225 within the storage tank 211 of the coolant heater 210 so as to better transfer heat to the heater coolant prior to the exhaust exhausting from the burner 210 to the atmosphere through exhaust stack 250.

The potable water circuit 201 includes a potable water tank 224 and a pump 230 used to pump the potable water to the first heat exchanger 211, through a mixing valve 231 and thence to the various potable water outlets 232. The pump 230 also is used to provide cold water through potable water circuit 233. A further potable water inlet 234 may be conveniently be provided for hookup to the potable water circuit 201 when the vehicle or boat has access to such a source such as a city supply of potable water. A three way water valve 240 will be operably installed between the two potable water sources 224, 234 with operator's control to valve 240 being provided to select the appropriate potable water source and which valve 240 may also be operated to allow the city source 234 go fill the potable water tank 224.

Engine coolant circuit 203 runs from the engine 241 to a pump 243 which conveniently provides the pumping pressure necessary for the heated engine coolant to pass through second heat exchanger 212 and to provide engine heat to the potable water and/or the coolant of the coolant heater 210.

Two pumps 243, 244 are conveniently also provided within the distribution module casing diagrammatically illustrated at 205. Each of the pumps 243, 244 is independently operated. Pump 243 provides coolant to the winter loop circuit 202. Pump 244 provides coolant to the summer loop 220 when the winter solenoid 214 is initiated to enable the summer loop 220.

In operation, it will be assumed that the boat or vehicle is being operated away from a land based source of potable water and without engine operation of the vehicle or boat; that is, the boat or vehicle is not underway. It will further be assumed that the winter loop 202 is being used and that coolant is being provided to the zone heaters 221. Winter solenoid 214, therefore, will be closed thus preventing coolant from the second heat exchanger 212 from passing through the valve between the winter loop 202 and the summer loop 220 and directing all coolant through the pump 243 and into the winter loop 202.

The operation of the coolant heater 210 will be initiated and coolant will be pumped through the coolant heater 210 by way of pump 243 in winter loop 202. Coolant leaving the coolant heater will pass into first heat exchanger 211 and thence through second heat exchanger 212. Since the solenoid 214 is closed, heated coolant will pass through winter loop 202 to the zone heaters 221, thence to the overflow tank 222, through the summer loop 220 and back to the coolant heater 210 for coolant reheating.

During this circulation of coolant from the coolant heater 210, potable water from the potable water tank 224 will pass through the first heat exchanger 211 by way of mixing valve 231 where the temperature of the potable water passing to the potable water outlets 232 is regulated to obtain controlled temperature potable water from the various outlets 232. Cold water from the potable water tank 224 will be provided directly to the potable water outlets 232 through circuit 233 without the need for the water passing through the mixing valve 231 or first heat exchanger 211.

In the event heat from the zone heaters 221 is not required, the winter loop 202 will be closed by opening the solenoid operated valve 214 which will allow the heated coolant to pass directly through the summer loop 220 and back to the coolant heater 210. The operation of pump 243 will be terminated with the opening of solenoid valve 214.

If the vehicle or boat is underway with the engine 241 in operation, the heat produced by the engine coolant in engine coolant circuit 203 will be used and the operation of the burner 223 of the coolant heater 210 will ordinarily be terminated. One of the pumps 243, 244 will be operated to circulate the coolant heater coolant through either the winter or summer circuits 202, 220, respectively. This heater coolant is then heated by the engine coolant passing through second heat exchanger 212. The heated engine coolant passes through second heat exchanger 212 and then returns directly to the engine 241 for reheating. Since the potable water passes through first heat exchanger 211, it will be heated by the heater coolant. The temperature of the water exiting to the potable water outlets 232 is again regulated by the mixing valve 231. The operation of both winter and summer loops 202, 220 is the same as earlier described.

In the event a shore based potable water source is used, water valve 240 is closed to the potable water tank 224 and water from the city connection 234 is provided directly to the potable water loop 201. Water valve 240, being a three water valve, will also allow the filling of potable water tank 224 from the city water connection 234.

Figure 7:
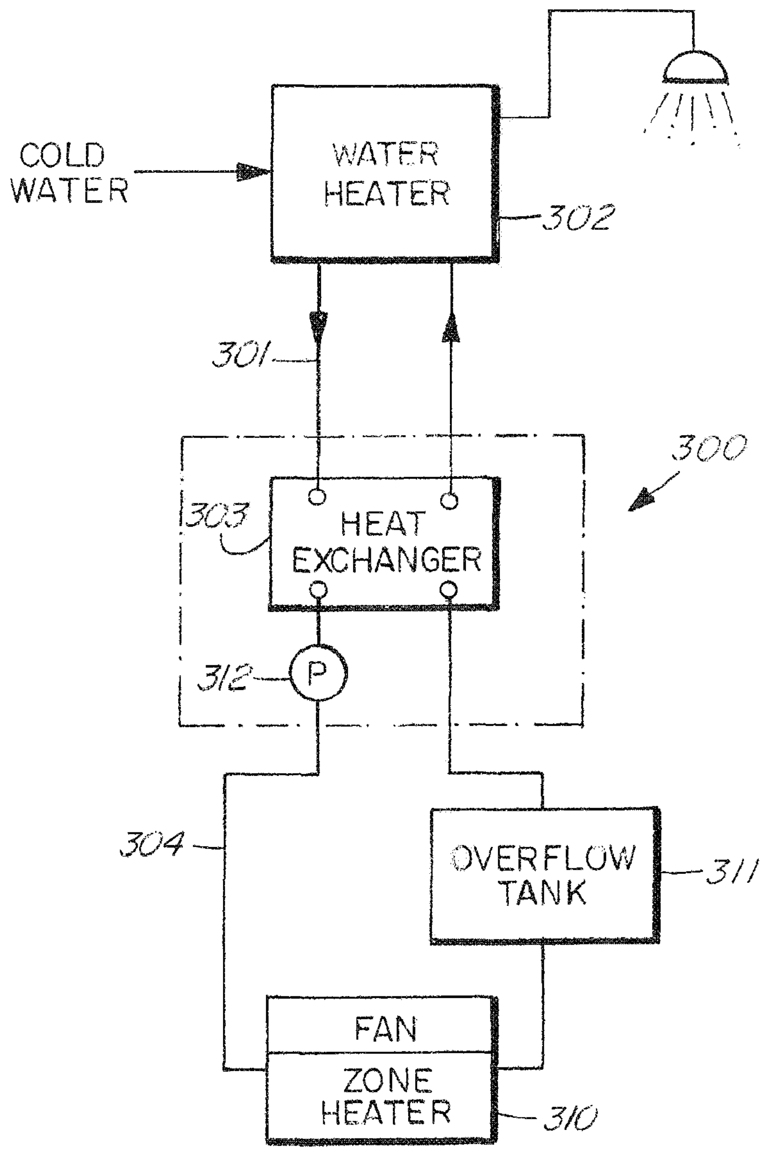
FIG. 7 is a diagrammatic schematic of a distribution module according to a further aspect of the invention but which distribution module is used only with the potable water heater circuit and the coolant circuit used for zone heating.

Yet a further distribution module is illustrated generally at 300 in FIG. 7. This distribution module is utilised with only two circuits, namely the potable water circuit 301 which passes the potable water from the potable water heater 302 through the heat exchanger 303 and which potable water then returns to the water heater 302 or which is otherwise used in the potable water circuit 301. The coolant circuit 304 utilises coolant heated by the potable water within heat exchanger 303 and that heated coolant is circulated through the zone heater 310 and overflow tank 311 by the use of pump 312 which is also located within the distribution module 300.

Figure 2:
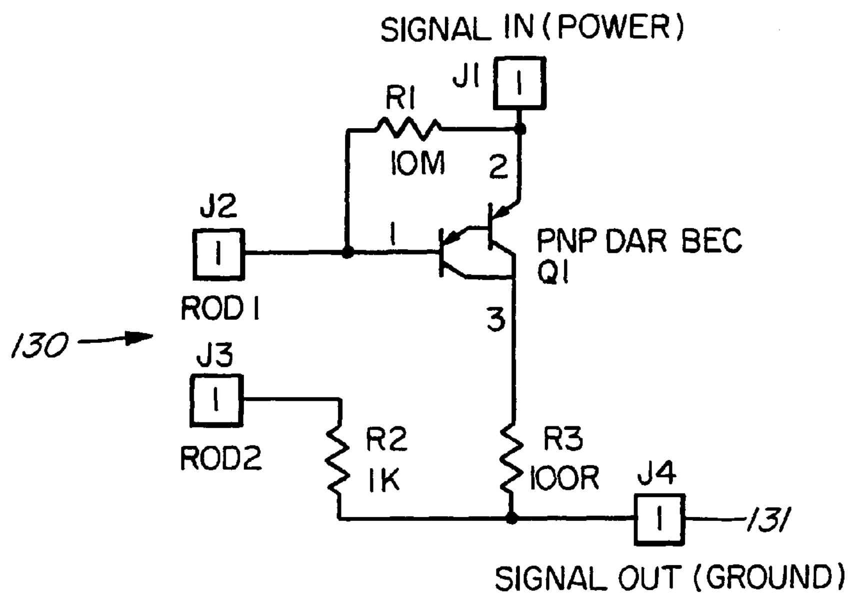
FIG. 2 is a schematic of the circuit used with the water level sensor according to a further aspect of the invention.

Many modifications will readily occur to those skilled in the art to which the invention relates. For example, although the exhaust stack is shown to be in a rectangular configuration as viewed in FIG. 2, the shape could of course change as design circumstances change and while the exhaust stack is shown as traveling down only one side of the water jacket 110, the hot exhaust could also travel within the water jacket 110 in several other configurations on various sides of the burner tube 101 and on each side of the burner tube 101 if desired. And while only one pass of the hot exhaust through the water jacket 114 is described and illustrated, more than one pass for the hot exhaust is readily contemplated.

It is further contemplated that the potable water heater according to the invention may conveniently be used in a living environment other than in marine or vehicle use. Such a heater requires initial power to initiate the combustion flame but, following that ignition, the heater could operate on minimal power or the energy generated by the heater could be used to produce the necessary power for continued operation.

Many further embodiments will readily occur to those skilled in the art to which the invention relates and the particular embodiments described are given by way of example only and are not intended as limiting the scope of the invention as defined in accordance with the accompanying claims.

We claim:

1. Distribution module for a hydronic heating system which hydronic heating system includes an engine and a coolant heater including a coolant heater casing, said coolant heater including a fluid nozzle which creates a flame within a burner tube, said distribution module comprising a distribution module casing located remotely from said coolant heater casing, an engine heater coolant inlet and outlet to allow for the ingress to and egress from said distribution module casing of coolant from an engine, a potable water inlet and outlet to allow for the ingress to and egress from said distribution module casing of potable water, a coolant heater inlet and outlet to allow for the ingress to and egress from said distribution module casing of coolant from the coolant heater and a series of components including at least one heat exchanger within said distribution module casing, said heat exchanger being used to exchange heat between said heater coolant and/or said engine coolant and said potable water, said at least one heat exchanger, said engine heater coolant inlet and outlet, said potable water inlet and outlet, said coolant heater inlet and outlet all being mounted within or connected to said distribution module casing of said distribution module, said distribution module casing being separated from said coolant heater casing and being located remotely from and outside said engine and said coolant heater casing, said series of components within said distribution module casing including said heat exchanger being located only within said distribution module casing and said burner tube of said coolant heater not being mounted within said distribution module or said distribution module casing.

2. Distribution module as in claim 1 wherein said components within said distribution module casing further include a zone heater coolant inlet and outlet to allow for the ingress to and egress from said distribution module casing of zone heater coolant and at least one pump to pump said coolant through said zone heater, said zone heater coolant inlet and outlet and said at least one pump being mounted within or connected to said distributor module casing.

3. Distribution module as in claim 2 and further comprising a summer loop for circulating said zone heater coolant to bypass said zone heater, a second pump to circulate said zone heater coolant through said summer loop and a valve to bypass said zone heater and allow said zone heater coolant to flow through said summer loop.

4. Distribution module as in claim 1 and wherein said components within said distribution module casing further comprise a mixing valve to adjust the temperature of said potable water being used for personal use.

5. Distribution module as in claim 2 and wherein said components further comprise a second heat exchanger, said first heat exchanger exchanging heat between said potable water and said coolant from said coolant heater and said second heat exchanger exchanging heat between said coolant from said engine and said coolant from said coolant heater, said second heat exchanger being positioned within said distribution module casing.

6. Distribution module for a hydronic heating system which hydronic heating system includes an engine and a coolant heater having a coolant heater casing, said coolant heater including a burner tube operable to contain a burner flame, said distribution module comprising a casing, an inlet and an outlet for connection to a potable water heater circuit, an inlet and outlet for connection to said engine, a heat exchanger having an inlet and outlet for said potable water heater circuit, an inlet and outlet for connection to a coolant circuit containing a zone heater and a pump for moving said coolant through said coolant circuit, said pump and said heat exchanger being positioned within said distribution module casing of said distribution module, said distribution module casing being located remotely from and outside said coolant heater and said engine, said casing of said distribution module not including the burner tube within said distribution module or said distribution module casing.

7. Distribution module as in claim 6 and further comprising an overflow tank in said coolant circuit.

* * * * *